United States Patent
Kirkpatrick et al.

(10) Patent No.: US 6,901,561 B1
(45) Date of Patent: May 31, 2005

(54) APPARATUS AND METHOD FOR USING A TARGET BASED COMPUTER VISION SYSTEM FOR USER INTERACTION

(75) Inventors: Edward Scott Kirkpatrick, Croton-on-Hudson, NY (US); Frederik C. M. Kjeldsen, Poughkeepsie, NY (US); Lurng-Kuo Liu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/420,796

(22) Filed: Oct. 19, 1999

(51) Int. Cl.[7] .............................................. G09G 5/00
(52) U.S. Cl. ...................... 715/863; 715/781; 715/700; 715/716
(58) Field of Search ............................ 715/700, 764, 715/781, 856, 863, 866, 589, 157, 158; 382/118, 155, 159, 162, 165; 700/47

(56) References Cited

U.S. PATENT DOCUMENTS

| | | | | |
|---|---|---|---|---|
| 5,381,158 A | * | 1/1995 | Takahara et al. ............ 345/156 |
| 5,594,469 A | * | 1/1997 | Freeman et al. ............. 345/157 |
| 5,990,893 A | * | 11/1999 | Numazaki .................... 345/764 |
| 6,111,580 A | * | 8/2000 | Kazama et al. .............. 345/863 |
| 6,118,888 A | * | 9/2000 | Chino et al. ................. 345/705 |
| 6,191,773 B1 | * | 2/2001 | Maruno et al. ............. 345/158 |
| 6,498,628 B2 | * | 12/2002 | Iwamura ..................... 348/734 |

FOREIGN PATENT DOCUMENTS

| JP | 1148411 A2 | * | 10/2001 | ............. G06F/3/00 |
|---|---|---|---|---|
| WO | WO 99/21122 | * | 4/1999 | ............. G06K/9/00 |

* cited by examiner

*Primary Examiner*—Sy D. Luu
(74) *Attorney, Agent, or Firm*—Richard M. Ludwin, Esq.; McGinn & Gibb, PLLC

(57) ABSTRACT

A method and apparatus are provided for training a computer system to recognize specific actions of a user. This may include displaying an image of a user within a window on a screen. The window includes a target area. This may also include associating a first computer event with a first user action displayed in the target area and storing information in a memory device such that the first user action is associated with the first computer event.

38 Claims, 3 Drawing Sheets

APPARATUS AND METHOD FOR USING A TARGET BASED COMPUTER VISION SYSTEM FOR USER INTERACTION

BACKGROUND OF THE INVENTION

1. Field of the Invention

The present invention generally relates to a method and apparatus to recognize actions of a user and to have those actions correspond to specific computer functions.

2. Description of the Related Art

Many people find it difficult to use computers because of problems operating current input devices such as a keyboard or a mouse. This includes users with physical disabilities, young children and people who have never learned to use a computer but find themselves confronted with one at a public kiosk or similar workstation. Alternative input devices have been developed, such as touch screens and single-switch devices, but these have two distinct disadvantages. First, they rely on physical devices that often must be carefully setup for the user, and are prone to damage or vandalism in public places. Second, they do not allow the full range of expression needed to effectively interact with current computer applications.

It is therefore desirable to provide a means to allow people to use computer systems without the use of physical interface devices. Many methods have been explored to allow users to interact with machines by way of gestures and movements using cameras. Most of these methods, however, have one or more of several limitations. Either they are very limited in the type of gesture they can recognize, they require extensive customization for a specific user, they are not robust in the face of environmental conditions, they are not reliable or they require extensive user training. A robust, flexible and user friendly method and apparatus is needed to allow a computer to recognize a wide range of user actions using a camera.

SUMMARY OF THE INVENTION

In view of the foregoing and other problems of the conventional methods, it is, therefore, an object of the present invention to provide a structure and method for training a computer system to recognize specific actions of a user.

The method may include displaying an image of a user within a window on a screen. The window may include a target area. The method may also include associating a first computer event with a first user action displayed in the target area and storing information in a memory device such that the first user action is associated with the first computer event.

A system is also provided that may associate specific user actions with specific computer commands. The system may include an image capture system that captures an image of a user. The system may also include an image display system that displays said image captured by the image capture system within a window on a display screen. The system may recognize the specific user actions and associate the specific user actions with the specific computer commands.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS OF THE INVENTION

As will be described below in greater detail, the present system and method according to the present invention allows a user to define (i.e. predetermine) a target (or target region) in an image provided by a camera (i.e. an image capture system that captures a series of images from the incoming video stream). The user is allowed to describe or demonstrate what it means to activate the target that was predetermined during a training stage and to define a specific computer function to be associated with that activation (e.g., mouse click). Thereafter, whenever the system detects activation of the target, the computer system will perform the associated function. The system may activate the target by: (1) detecting a state, (2) detecting a motion or (3) detecting an intersection between an object in the scene and an object. These ways of activating the target will be discussed below in greater detail. One skilled in the art would understand that these methods of activating the target are illustrative only and are not meant to be limiting. That is, other methods of activating the target are also within the scope of the present invention.

Figure 1:
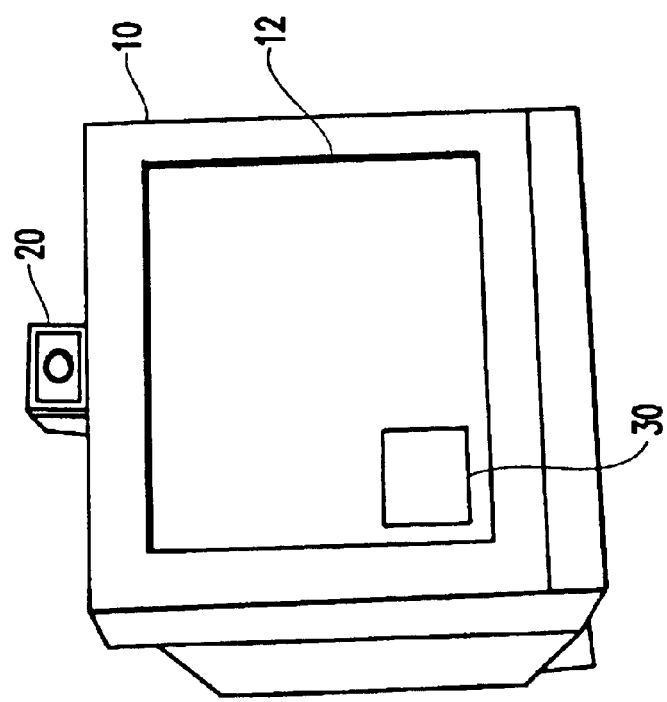
FIG. 1 shows the image capture system and display device according to the present invention.

The present invention will now be described with reference to the accompanying figures. FIG. 1 shows a display device 10 having a display screen 12. The display device 10 preferably is a conventional computer screen display and is connected to a conventional computer system as will be described below. An image capture system 20 may be positioned at any location such that it captures the image of the user. In one embodiment, the display device 10 and image capture system 20 may be provided in public kiosks.

As shown in FIG. 1, the display screen 12 includes a window 30 that displays a picture of the image that is captured by the image capture system 20. The window 30 is shown in the lower left-hand corner of the display screen 12 but it is not limited to this location. Rather, the window 30 may be displayed at any appropriate location on the screen 12. The computer system will include the appropriate hardware and software components that will connect the image capture system 20 to the computer system such that the image captured by the image capture system 20 is displayed within the window 30. The display screen 12 will also show a normal computer screen and will provide computer prompts in a normal manner.

Figure 2A:
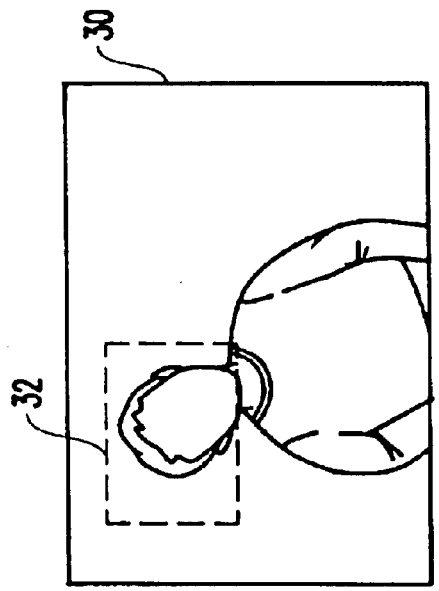
FIGS. 2A and 2B show two different positions of the user and the target area within a window on a display according to the present invention.
Figure 2B:
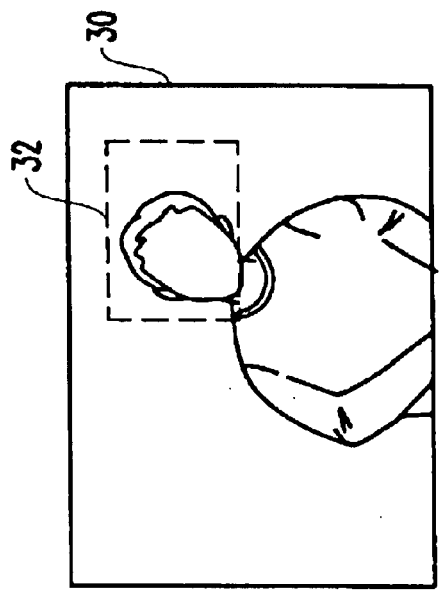

The computer system preferably includes a training phase that occurs before the system begins operation. The system operates based on software/hardware that will be connected to the system. In the training phase, the image capture system 20 captures an image of the user and displays the "reversed" image within the window 30 on the display screen 12. The user sees himself in much the same way as he would see himself in a mirror. In the training phase, the computer system is programmed to produce a visible target area 32 within the window 30 such as shown in FIGS. 2A and 2B. The target area 32 is preferably movable about the window 30 using a pointing device or speech recognition system. The system is also capable of locating another target area 32 within another area of the window 30. The computer system will be trained to associate specific user movements/actions (or gestures) with respective computer functions. The user preferably demonstrates or describes the action. Demonstration occurs, for example, by the user hitting a key when the action is being performed, or just before and just after the action is performed. Features relating to the movements/actions will be stored in a memory device so the system will recognize the specific movements/actions after the training phase and associate the movements/actions with the respective computer function.

In the training phase, the image capture system 20 initially displays an image of the user within the window 30. Features of this image may be stored in a memory device in order to help in recognizing the future movements/actions of the user. The target area 32 is displayed in the window 30 and may be positioned by the user or may be automatically positioned by the system. While the target area 32 is displayed within the window 30, one skilled in the art would understand that the target area 32 corresponds to a specific area as seen by the image capture system 20.

The target area 32 may be a rectangular shape, a square shape, a circle shape or any other type of shape. As discussed above, the user may locate or relocate the target area 32 about the window 30 using a pointing device or speech recognition system. The user may also manipulate the size (i.e., the dimensions) of the target area using respective input commands. The user may also define more than one target area, each with its associated function.

The computer system preferably prompts the user to perform an action within the target area 32 that will be associated with a specific computer function. For example, in FIG. 2A, the user is shown as tilting his head to the left within the window 30. By tilting the head to within the target area 32, the computer system recognizes the action within the target area 32. For example, the system may use background averaging, template or color predicate methods to recognize when part of a user's body is within the "target". Other methods will be described below. The training image(s) or features extracted from the training image(s), such as a summary, may then be stored in a memory device so that the computer system may recognize this future movement. While FIG. 2A shows movement of the head, this movement/action is not to be limiting as a type of movement/action (gesture) of a user. Rather, the user may move a hand, another part of the user's body or another object within the target area 32.

The movement/action will then be associated with a specific computer function. For example, the user may be asked to associate that specific movement/action within the target area 32 as corresponding to a specific computer function. One preferred computer function is that of a mouse click or the movement of a pointing device on the screen (i.e., movement of a cursor to the left or right). The movement may also correspond to other computer functions and/or letters/symbols. The computer system associates the inputted computer function (i.e., a mouse click) as corresponding to the movement/action shown within the target area 32.

In a subsequent step of the training phase, another target area 32 may be placed in a new location as shown in FIG. 2B. In this figure, the user performs a second movement/action such as tilting the head to the right as viewed in the window 30. The altered image of the user within the target area 32 may be stored in a memory device. The computer system may again ask for (or automatically provide) a respective computer function that will correspond to this movement. The association is stored in the memory device for future use.

The above example describes that the user performs a movement/action and then the user provides a corresponding computer function that will be associated with that movement. However, the computer system may automatically provide a respective computer function based on either a first, second or third movement or may merely automatically associate different movements with a specific computer function. What is important is that the movement of the user is associated with a respective computer function either automatically or based on the user requested function.

This training phase continues so that the computer system will be trained to recognize different computer functions based on different movements/actions of the user.

Once the user has appropriately trained the computer system to recognize his/her movements/actions (or gestures), the computer system may enter a normal operation phase while running a specific program/game/utility in which it will recognize the user's movements, such as a head tilt to the right or to the left and will associate that movement with the previously stored computer function. The computer system accomplishes this by capturing the image of the user using the image capture system 20. The image of the user is preferably displayed on the display screen 12 so the user will see his/her own movements. The target area 32 does not need to be displayed in this mode. The user may then perform normal computer operations in a similar manner to a person using a mouse or other pointing device because the computer has been trained to recognize specific functions based on the movements of the user.

Figure 3:
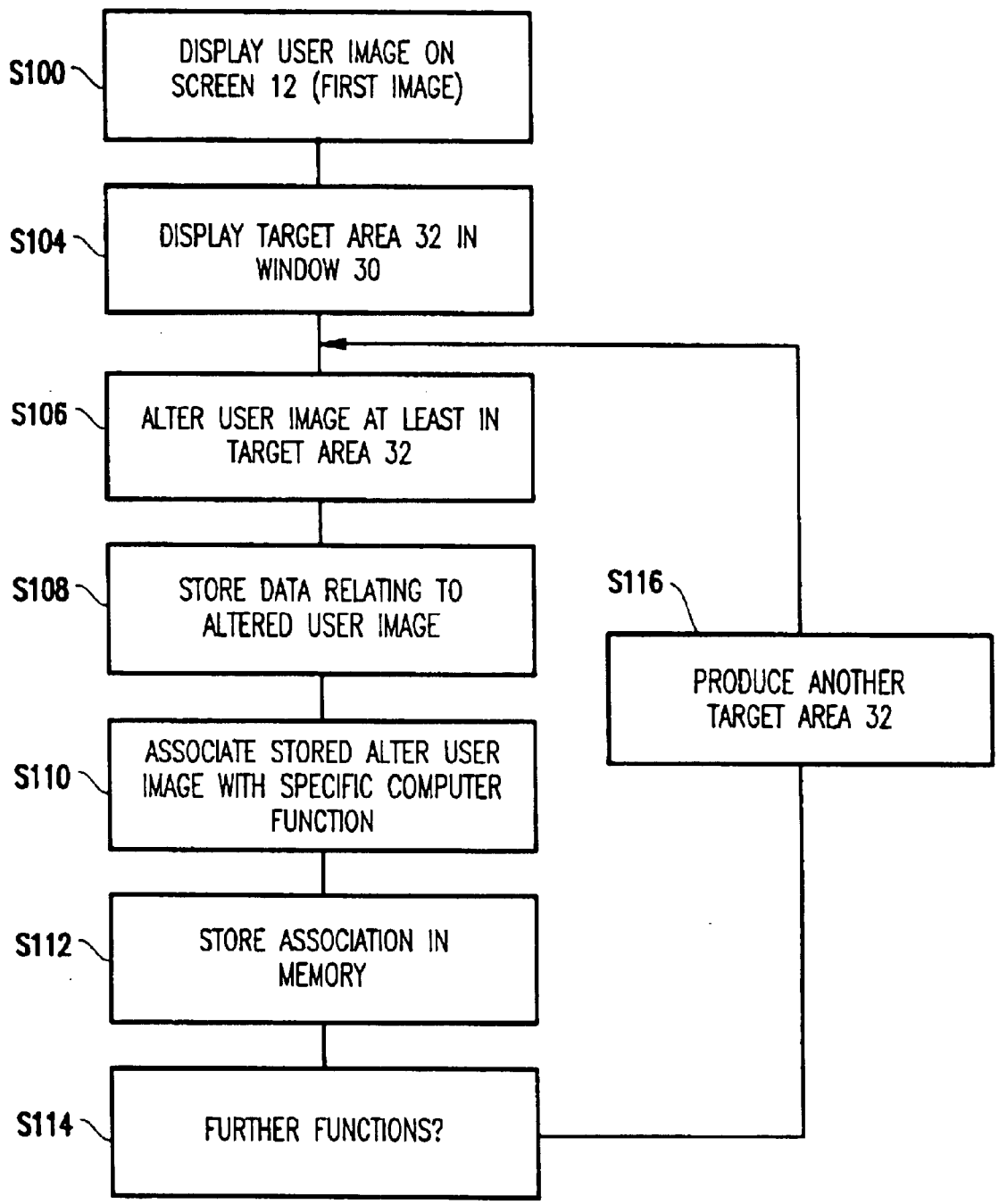
FIG. 3 is a flowchart showing a preferred method of the present invention.

FIG. 3 is a flowchart showing the inventive methodology of the training phase according to the present invention. In step S100, a user image is displayed on the screen 12 within the window 30. Subsequently, the target area 32 is displayed in the window 30 in step S104. The user image is altered preferably by user movement in the target area 32 in step S106. Data from the training image(s) may be stored in step S108. The stored data is then associated with a specific computer function in step S110. This association may be stored in memory in step S112. Other movements/actions may be associated with additional functions by producing another target area 32 in step S116 and repeating steps S106–S114 for that new target area 32. It is understood that while FIG. 3 shows a preferred method of the present invention, the number of steps and the order of the steps need not be the same as shown in FIG. 3.

Figure 4:
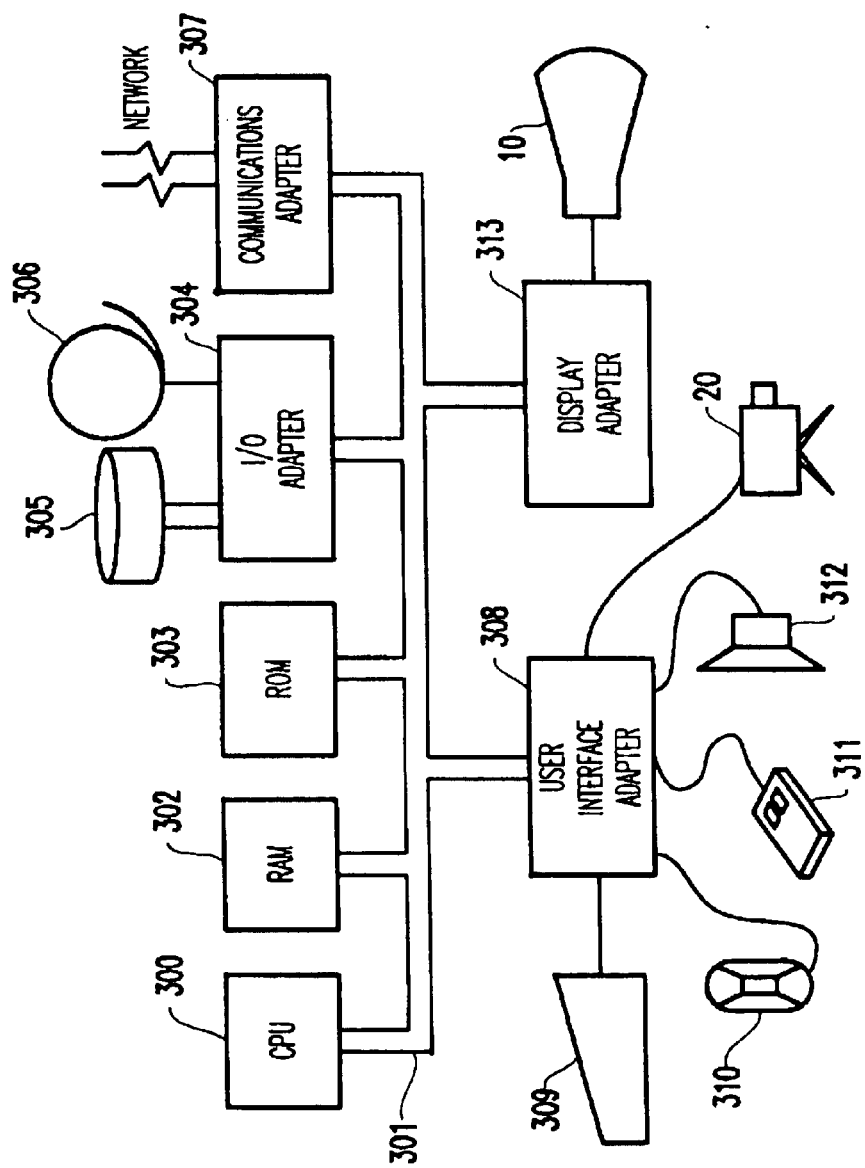
FIG. 4 shows a hardware configuration of an information handling/computer system for operating the present invention.

FIG. 4 illustrates a typical hardware configuration of an information handling/computer system for operating the present invention. Such a system preferably has at least one processor or central processing unit (CPU) 300. The CPU 300 may be interconnected via a system bus 301 to a random access memory (RAM) 302, read-only memory (ROM) 303, input/output (I/O) adapter 304 (for connecting peripheral devices such as disk units 305 and tape drives 306 to the bus 301), communication adapter 307 (for connecting an information handling system to a data processing network), user interface adapter 308 (for connecting a keyboard 309, microphone 310, mouse 311, speaker 312, image capture system 20 and/or other user interface device to the bus 301), and display adapter 313 (for connecting the bus 301 to a display device 10). As is understood to one skilled in the art, the program that executes the above described method according to the present invention may be stored on a floppy disk or be stored within the memory.

Such a method as described above may be implemented, for example, by operating a computer, as embodied by a digital data processing apparatus, to execute a sequence of machine-readable instructions. These instructions may reside in various types of signal-bearing media.

Thus, the present invention may be directed to a programmed product, including signal-bearing media tangibly embodying a program of machine-readable instructions executable by a digital data processor.

Figure 5:
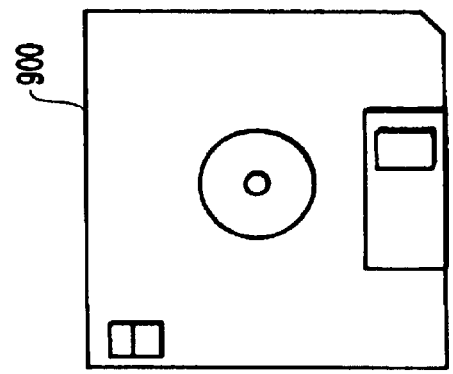
FIG. 5 shows a magnetic data storage diskette that may store a program according to the present invention.

This signal-bearing media may include, for example, a random access memory (RAM) such as for example a fast-access storage contained within the computer. Alternatively, the instructions may be contained in another signal-bearing media, such as a magnetic storage diskette 900 shown exemplarily in FIG. 5, directly or indirectly accessible by the computer.

Whether contained in the diskette, the computer, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a suitable language.

One alternative to this invention is the use of a touch screen and various onscreen cues or targets. This has the drawback that it is less durable than a camera (that can be located safely behind a small hole in the display bezel or kiosk facing), and can only be used at close range.

As discussed below, the present invention has at least three different methods to activate the target. These are: (1) detecting a state, (2) detecting a motion, or (3) detecting intersection between an object in the scene and an object. These methods will now be discussed in greater detail. Other methods of activating the target are also within the scope of the present invention as these methods are merely illustrative.

The first method to activate the target is detecting a pattern of color. During the training phase, the state of the target 32 may be demonstrated to the system. A summary of this color pattern (i.e., a color histogram) may be saved. The color pattern of each subsequent image during the normal operational phase may be matched to the one from the training phase, and if it is sufficiently close, then the target will be considered activated. Alternatively, two states may be demonstrated during training (i.e., target empty and target full). The new patterns may be matched to each of those, and the system will decide which is closer. Other types of states may also be statistical properties, such as average pixel intensity, shape properties such as number or pattern of lines, and possibly others.

A second method of activating the target is detecting a motion. During training, the user may either describe or demonstrate a motion within the target 32. This may be, for example, a left-to-right motion. The system may monitor the motion within the target 32 during subsequent images using standard techniques (e.g. optical flow, feature tracking, etc) and produce summaries of that motion. When a target motion matches the originally trained motion, then the target will be considered activated. To demonstrate the motion, during training the user may prime the system by some standard technique such as a menu item. Then, the user may perform the motion (e.g., wave their hand through the target) and then tell the system they were done. The system monitors the motion within the target during that time interval, and produces and saves a summary of that motion. The system then monitors and matches the motion summary as described above.

A third method of activating the target may be by intersection detection. During training, the user may identify an object in the scene. The system may then track that object in subsequent images. When that object intersects the target, the target is considered activated. Object tracking can be done using a variety of existing techniques. One class of tracking techniques involves identifying the object explicitly for the system. The system then extracts information that uniquely identifies the object (i.e., color pattern, pixel template, etc). Subsequent images are searched for that object using color segmentation, template matching, etc. A second class involves showing the system a background image during training that does not contain the object. The system compares subsequent images to the background image to determine if the object is present. In either case, the system may identify the boundaries of the object being tracked and determines if it overlaps the target 32.

As a further embodiment, the target region may be used for more than binary activation. That is, rather than being activated or not, the target may be determined to be in a number of states. Each of these states may have a different computer function associated with it. For example, the motion (e.g. a hand in the target) within the target may be summarized as an average motion vector. As one example, the cursor on the screen may then be moved by a direction and an amount derived by passing that vector through an appropriate transfer function. Further, if a user's hand (or other type of activating object) remains within the target region beyond a predetermined time, then the cursor on the screen would continue to move in a left direction, for example. Other variations are also apparent to one skilled in the art.

While the invention has been described with reference to specific embodiments, the description of the specific embodiments is illustrative only and is not to be considered as limiting the scope of the invention. Various other modifications and changes may occur to those skilled in the art without departing from the spirit and scope of the invention.

What is claimed is:

1. A method of training a computer system to recognize a specific action of a user and associate the specific action with a computer event, said method comprising:

capturing a first image of a user within a first predetermined window in a video stream;

displaying said user image including said first predetermined window;

determining that a state of said first predetermined window is to be associated with a first computer event;

associating said first computer event with said state of said first predetermined window in response to said determination; and storing information in a memory device regarding said association.

2. The method of claim 1, further comprising:

capturing a second image of said user within said first predetermined window; and displaying said second image, wherein a first indication indicates that a change of state between said first and second images in said first predetermined window is to be associated with said computer event, and wherein said associating said first computer event with said state of said first predetermined window comprises associating said change of state with said first computer event.

3. The method of claim 2, wherein said change of state comprises a change of color in said first predetermined window.

4. The method of claim 3, wherein said associating said first computer event with said state of said first predetermined window comprises storing a summary of said colors in said first predetermined window.

5. The method of claim 2, wherein said change of state comprises a pattern of activity within said video stream which indicates a change of position of said image of said user within said first predetermined window.

6. The method of claim 1, wherein said first image includes an image of an object in said first predetermined window.

7. The method of claim 1, wherein said first computer event comprises a specific computer function to execute.

8. The method of claim 1, wherein said first predetermined window is one of a rectangular area, a circular area and a square area.

9. The method of claim 1, wherein said first computer event comprises a plurality of computer events.

10. The method of claim 1, further comprising positioning said predetermined window within said video stream.

11. The method of claim 1, wherein positioning said predetermined window comprises locating said predetermined window within said video stream using one of a user input command and a program command.

12. The method of claim 1, wherein said first image further comprises a second predetermined window, the method further comprising:
 determining that a state of said second predetermined window is to be associated with a second computer event; and
 associating said second computer event with a state of said second predetermined window, wherein said storing of information further comprises storing information in said memory device regarding said association of said second computer event with a state of said second predetermined window.

13. The method of claim 1, wherein said first computer event comprises a mouse click action.

14. A method of using a computer system having an image capture system that displays an image of a user on a display screen, said method comprising:
 enabling said computer system to associate a state of a first predetermined window within a video stream with a first computer event;
 capturing said state of said first predetermined window with said image capture system; and
 performing said first computer event in response to said state of said first predetermined window being captured by said image capture system.

15. The method of claim 14, wherein said enabling comprises:
 capturing said first image;
 displaying said first image;
 determining that a state of said first predetermined window is to be associated with a first computer event;
 associating said first computer event with said state of said first predetermined window in response to a first indication; and
 storing information in a memory device regarding said association of said first computer event with said state of said first predetermined window.

16. The method of claim 14, further comprising positioning said first predetermined window within said video stream.

17. The method of claim 15, further comprising:
 producing a second predetermined window within said video stream;
 capturing a second image including said second predetermined window which includes a user image;
 determining that a state of said second predetermined window is to be associated with a second computer event;
 associating said second computer event with said state of said second predetermined window in response to a second indication; and
 storing information in said memory device such that said state of said second predetermined window is associated with said second computer event.

18. A system that associates a specific user action with a first computer command, said system comprising:
 an image capture system that captures a first image of a user within a video stream including a first predetermined window, wherein the state of the first predetermined window indicates said specific user action;
 an image display system that displays said first image captured by said image capture system on a display screen; and
 a computer system that recognizes a state of said first predetermined window as corresponding to an association of said state of said first predetermined window to said first computer command.

19. The system of claim 18, wherein said computer system is adapted to perform a training phase to train the computer system to recognize said specific user action, said training phase comprising:
 displaying said first image that is captured by said image capture system including said user image which includes said first predetermined window;
 associating said first computer command with said state of said first predetermined window; and
 storing information in a memory device regarding said association of said first computer command with said state of said first predetermined window.

20. The system of claim 19, wherein said training phase further comprises:
 capturing a second image including a second predetermined window;
 associating a second computer command with a state of said second predetermined window; and
 storing information in said memory device regarding said association of said state of said second predetermined window with said second computer command.

21. A program storage device readable by machine, tangibly embodying a program of instructions executable by the machine to perform method steps for training a system to recognize specific user actions, said method comprising:
 capturing a first image of a user within a first predetermined window;
 displaying said first image including said user image in said first predetermined window;

determining that a state of said first predetermined window is to be associated with a first computer event;

associating said first computer event with said state of said first predetermined window in response to said determination; and storing information in a memory device regarding said association.

22. A method of enabling a computer system to recognize specific actions of a user, said method comprising:

capturing an image of the user within a predetermined window in a video stream;

associating a computer event with a state of the predetermined window; and storing information in a memory device regarding said association.

23. The method of claim 22, further comprising displaying said image including said predetermined window.

24. The method of claim 22, further comprising determining that said state of the predetermined window is to be associated with said computer event before associating said computer event with said state.

25. The method of claim 22, further comprising capturing another image of said user within said predetermined window.

26. The method of claim 25, further comprising displaying said another image in said predetermined window.

27. The method of claim 25, further comprising receiving an indication that a change of state between said image and said another image in said predetermined window is to be associated with said computer event.

28. The method of claim 27, wherein associating of said computer event with said state of said predetermined window comprises associating said change of state with said computer event.

29. The method of claim 28, wherein said change of state comprises a change of color in said predetermined window.

30. The method of claim 29, wherein said associating said computer event with said change of state comprises storing a summary of said colors in said predetermined window.

31. The method of claim 28, wherein said change of state comprises a pattern of activity within said video stream which indicates a change of position of said image of said user within said predetermined window.

32. The method of claim 22, wherein said image comprises an image of an object in said predetermined window.

33. The method of claim 22, wherein said computer event comprises a specific computer function to execute.

34. The method of claim 22, wherein said predetermined window comprises one of a rectangular area, a circular area, and a square area.

35. The method of claim 22, wherein said computer event comprises a plurality of computer events.

36. The method of claim 22, further comprising positioning said predetermined window within said video stream.

37. The method of claim 36, wherein said positioning said predetermined window comprises locating said predetermined window within said video stream using one of a user input command and a program command.

38. The method of claim 22, wherein said computer event comprises a mouse click action.

* * * * *